Oct. 31, 1939.  J. S. KIMBLE ET AL  2,177,659
METHOD FOR IMPROVING THERMOPLASTIC SHEETING
Filed Feb. 25, 1937
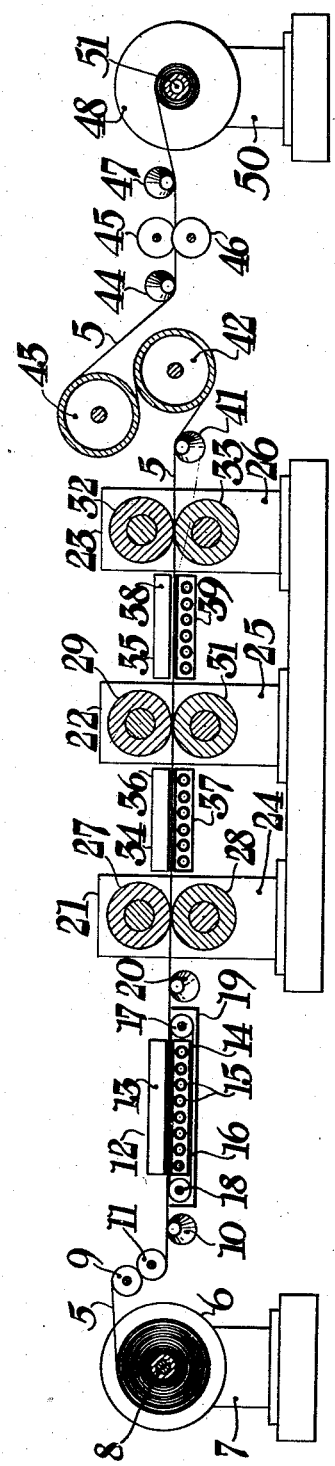
John S. Kimble &
John S. M°Lellan,
INVENTORS:
N. M. Perrin
Daniel J. Mayne
ATTORNEYS.

Patented Oct. 31, 1939

2,177,659

UNITED STATES PATENT OFFICE 2,177,659

METHOD FOR IMPROVING THERMO-PLASTIC SHEETING

John S. Kimble and John S. McLellan, Kingsport, Tenn., assignors to Eastman Kodak Company, Rochester, N. Y., a corporation of New Jersey Application February 25, 1937, Serial No. 127,663

3 Claims. (Cl. 18—55)

This invention relates to methods for the processing of sheeting of thermo-plastic materials and more particularly to a process and apparatus for improving the characteristics of transparent sheets of cellulose acetate, cellulose acetate propionate, ethyl and benzyl cellulose, and other organic derivatives of cellulose, and other suitable thermoplastic compounds which are employed in making laminated glass.

Process and apparatus for the manufacture of thin sheets and the use of such thin sheets are quite well known in the art. Such sheeting material is to a large extent produced and used for wrapping materials. In that instance the properties of such material need not be especially exacting. However, in certain industrial uses such as, for example, in the manufacture of laminated glass, the exact specifications of the sheeting becomes of considerable importance. While sheets produced by conventional methods may appear to the eye to be substantially uniform, in many instances it can be found by careful measurements that the sheets are of more or less non-uniform characteristics. That is, for example, conventionally produced sheeting may vary in thickness or different sections of sheeting may exhibit different strengths; or two similarly appearing sections of sheeting made at different times may have the same physical appearance but have markedly different shrinkage characteristics, owing to variations in the process of manufacture.

These variations, particularly shrinkage, are a source of considerable difficulty in the manufacture of laminated "safety" glass. A satisfactory method of making such laminated glass is to place a transparent sheet of thermoplastic material between two sheets of plate glass having a coating of adhesive on the side of the glass adjacent to the plastic sheet and preliminarily pressing them together by suitable pressing apparatus. The final pressing is conducted in an autoclave at a high temperature and pressure. A suitable, usually black, moisture proofing compound may then be placed around the edges of the lamination.

In such a process it will be seen that there are two periods of heating, the last being a relatively high temperature and pressure. It is during these operations that the thermoplastic lamination tends to pull away from the glass and produce "blowins" which resemble elongated bubbles. Usually these "blowins" occur at the edges of the glass, making not only a stain from the heating fluid used in the autoclave, but also an uneven margin when the black moisture proof sealing compound is used.

We have found that one noticeable cause of such "blowins" is the presence of residual strain in the thermoplastic lamination and when the assembly is heated these strains are released, causing a distortion and shrinkage of the thermoplastic layer.

An object, therefore, of the invention is an improved thermoplastic, substantially uniform and low-shrinking sheet or slab which is adaptable for use in making laminated glass.

Another object of the invention is a method for processing a thermoplastic sheet containing residual strains, to produce a substantially uniform and low-shrinking sheet therefrom.

Still another object is a method for changing the adhesiveness of the extruded sheeting prior to finishing. Other objects will appear hereinafter.

In accordance with the invention these and other objects are attained by conducting a suitable thermoplastic sheet through a heating chamber heated at a temperature sufficient to relieve residual strains in the sheet and while exerting a minimum of tension on the sheet. The sheet is then alternately calendered and heated to reduce the sheet to desired dimensions. It is then hardened under substantially no tension and may be cut to size and if desired wound on another spool without substantial tension being exerted thereon.

The invention will be more clearly understood from the following detailed description with reference to the attached drawing in which there is shown a diagrammatic elevation of our improved apparatus for the treatment of thermoplastic sheeting.

As shown in this drawing, numeral 5 designates a suitable thermoplastic sheeting, which contains residual strains and which may be of varying dimensions, wound on a spool 6 which is mounted on a support 7 and shaft 8.

Driven rolls 9 and 11 serve to unwind the sheet 5 from the spool 6. A pair of conical rolls 10 serve to center the sheet 5 before it enters the heating chamber 12. The heating chamber 12 comprises an upper platen 13 and a lower platen 14 one or both of which may be heated in a conventional manner for example by steam coils shown at 15 in the lower platen. An endless conveyor belt 16 revolves on drums 17 and 18 one or both of which may be driven if desired by a suitable chamber 12 for supporting and conveying the sheet 5 therethrough without exerting substantial tension upon it. The belt 16 is shielded by a shield 19 to prevent loss of heat from the belt during its rotation. A second pair of conical rolls 20 further centers the sheet 5 as it leaves the oven 12. While the sheet might be drawn thru the oven 12, a conveyor of the type described permits passage of the sheet with a minimum of tension.

Adjacent the heating chamber 12 is a plurality of calender devices 21, 22, and 23 comprising respectively mounting members 24, 25, and 26, and pairs of calender rolls 27 and 28; 29 and 31; 32 and 33. These rolls are capable of being adjusted to increase or decrease pressure on materials passing therethrough and may be heated or cooled in any suitable manner common in the art. Ahead of each of the calenders 22 and 23 are heating chambers 34 and 35 which may be of conventional design having upper and lower heated platens 36 and 37; and 38 and 39 respectively. If desired these heating chambers may be replaced by heating chambers of the type shown at 12 having an endless conveyor belt associated therewith.

Following the last series of calendering rolls is a pair of conical guide rolls 41 for the purpose of centering the moving sheet and a plurality of larger hollow cooling drums 42 and 43. These drums are positioned in spaced relationship to exhibit the greatest surface of the sheeting passing thereover to cooling effects and cool alternate sides of the sheet. The temperature of these drums may be regulated by suitable cooling fluids, such as cold water which may be introduced into the hollow drums in any satisfactory manner. Following the cooling drums, there is a pair of conical guide rolls 44, an edge trimming device having blades 45 and 46 interposed in series with a wind up spool 48 mounted on a support 50 and shaft 51.

For convenience of illustration we have shown sheeting taken from the spool 6. However, it will be understood that this is merely representative of any suitable sheeting feed. For instance, our above described machine may quite properly constitute an adjunct to the extrusion machine of the Kimble and Blackard application Ser. No. 127,661 of even date. In that case the sheeting extruded by the latter machine is continuously fed thru the oven 12 of our machine.

While various sized sheeting may be processed by our improved method the following example is given to illustrate the operation of the invention.

*Example*

A suitable spool 6 of sheeting 5 made of a thermoplastic composition of a cellulose derivative such as cellulose acetate and a plasticizer such as dimethyl phthalate is placed on shaft 8 of the apparatus. For purposes of illustration this sheeting may be .030 inch in thickness and 31 inches in width. It is conducted from spool 6 by driven rolls 9 and 11 over conical guide rolls 10 which center the sheet before it passes into heating chamber 12. In this chamber, which may be aproximately seven feet in length, the sheet 5 is supported and carried therethrough on the endless conveyor belt 16. The heating chamber is heated to approximately 132° C. with 140 pounds of steam. In this particular example the sheeting is preferably conducted through this heating chamber when it is heated at such temperatures at a rate so that a given portion of the sheet will be in the oven for approximately 80 seconds. This heating, cooperating with the method of supporting and conducting the sheet through the heating chamber without tension permits the residual strains to be dissipated, and the sheet on passing out of the chamber on the conveyor will contain substantially no residual forces which tend to produce shrinkage when being used in the manufacture of laminated glass. For cellulose acetate sheeting and sheeting of similar cellulose derivatives the oven 12 may be maintained at a temperature range of about 90° C. to 150° C. for best results and the time of treatment may be within a range of approximately 30 to 120 seconds.

This heat treatment, however, usually will change the dimensions of the sheet and to assure a sheet of uniform dimensions the sheet is now passed through one or more sets of calender rolls, preferably three sets of calenders 21, 22 and 23 which are preferably maintained at about 50° C., altho they may be maintained at any satisfactory calendering temperature such as from 30° to 80° C. The first pair of calendar rolls 27 and 28 are set about .027 inch apart, the second at .026 and the third at .024 giving a final sheet of .025 inch in thickness. Heating chambers 34 and 35 are also preferably maintained at approximately the same temperature as oven 12. The speed of the calender rolls is regulated so as to place a minimum of tension upon the sheet consistent with properly conducting the sheet thru the rolls.

On leaving the last calender 23 the sheet 5 is conducted over conical guide rolls 41 and around cooling drums 42 and 43 without substantial tension being exerted thereon. The cooling drums may be maintained at a temperature of approximately 20° C. The sheet being thus processed and cooled under substantially no tension will contain a minimum of residual strains. Accordingly it may be employed as the safety lamination in laminated glass with the assurance that a substantially uniform product will result, since a principal cause of shrinkage therein has been minimized. From the cooling drums the sheet is trimmed to a desired width by revolving blades 45 and 46 and then rolled up on spool 48.

The calender rolls, the cooling rolls and the take-up spool may be driven by any suitable source of power and controlled as desired consistent with the above teachings.

It will be understood that our process is applicable to any suitable sheet which as in the above example has been formed and rolled up on a spool. However, as before stated, our process may be used in cooperation with a suitable extrusion process for making thermoplastic sheeting such as that described in the above named copending application of Kimble and Blackard Ser. No. 127,661 so that any strains which may be introduced by extruding and conducting the sheet away from the die may be relieved before the sheet has cooled appreciably below the temperature of the die.

While we do not wish to commit ourselves to any exact theory of explanation of the good results obtained by the process and apparatus above described they are, we believe, based upon the proposition that any cast sheet, regardless of how it obtains its natural shape, contains residual strains and when the sheet is passed through our device, these strains equalize themselves on passing through the oven 12. At the same time, due to this heat treatment, the sheet may lose its exact dimensions somewhat and accordingly in order to reduce the sheet again to exact dimensions it must be calendered. The heating in the oven 12 therefore accomplishes the additional function of softening the sheet thoroughly so that it may be calendered with ease. While one calendering may suffice, we have found that if the sheet is to be reduced in thickness to any considerable extent, it is better to reduce the thickness of the sheet in small increments. Thus after the sheet has passed through the first set of calender rolls it is again softened in preparation for the next calendering step, etc., until the desired uniform thickness is obtained.

While in the above example for the treatment of a thin plasticized cellulose acetate sheet it is preferred to employ a heating chamber approximately seven feet long, it will be understood for the treatment of sheets of different dimensions that longer or shorter heating chambers may be employed with suitable variations in speed of conducting the sheeting through the oven and temperatures of heating. In some instances the degree of treatment in the last two heating chambers for the purpose of softening the sheeting may be of less magnitude than in the first heating chamber and this can be accomplished by reducing the length of these heating chambers.

What we claim is:

1. The continuous method of improving the physical characteristics of a cellulose organic derivative thermoplastic sheeting which comprises heating the sheet in a heating chamber while supporting the sheet without substantial tension being exerted thereon, reducing the thickness of the sheet in a series of calenders, heating the sheet between the calenders to facilitate calendering, and cooling the sheet while under substantially no tension.

2. The continuous method of improving the physical characteristics of a cellulose organic derivative thermoplastic sheeting which comprises heating the sheet to equalize any residual strains therein in a heating chamber while supporting the sheet without substantial tension being exerted thereon, reducing the thickness of the sheet in a series of calenders, softening the sheet by heating before it enters the respective calenders to enhance their operation, and cooling the sheet by passing it over cooling rolls while under substantially no tension.

3. The continuous method of improving the physical characteristics of thermoplastic sheeting which comprises heating the sheet to equalize residual strains therein in a heating chamber while supporting the sheet without substantial tension being exerted thereon, calendering the sheet to reduce the thickness of the sheet and conducting the sheet through a second heating chamber while supporting the sheet without substantial tension being exerted thereon.

JOHN S. KIMBLE.
JOHN S. McLELLAN.